UNITED STATES PATENT OFFICE.

LAKE H. SPRINKLE, OF BROOKLYN, AND MORRIS GREENMAN, OF NEW YORK, N. Y.

FEED-BAG FOR HORSES.

1,391,021.  Specification of Letters Patent.  Patented Sept. 20, 1921.

Application filed October 1, 1920. Serial No. 414,078.

*To all whom it may concern:*

Be it known that we, LAKE H. SPRINKLE and MORRIS GREENMAN, citizens of the United States, and residents, respectively, of 310 Carlton Ave., Brooklyn, in the county of Kings and State of New York, and 709 East 9th St., New York, in the county and State of New York, have invented a new and useful Feed-Bag for Horses, of which the following is a specification.

Our invention relates to improvements in a feed bag for horses, and it consists in the novel features hereinafter more fully described.

The objects of our improvement are:

First, to produce a feed bag that will not spill any oats or feed due to the shaking of the bag by the horse trying to reach the oats at the bottom of the bag.

Second, to promote the comfort of the horse by leaving its eyes and nose uncovered, and bringing the feed to its mouth automatically; and Third, to have said feed bag simple, durable and inexpensive. We attain these objects by the feed bag illustrated in the accompanying drawings or by any mechanical equivalent or obvious modifications of the same.

In the drawings Figure 1 is a front elevation of our feed bag, Fig. 2 is a side elevation of the same.

Similar numerals refer to similar parts throughout the two views.

11 designates the upper receptacle of our feed bag, which is to be placed on the head of the horse back of its ears; *i. e.*, on the crest of the horse's head; 12 is the lower receptacle which may be connected to the upper receptacle 11 by means of the straps 14 which may be stitched to each of said receptacles by means of the threads 14$^a$, or otherwise connected thereto.

Said lower receptacle 12 is to be placed with its lower part under the mouth of the horse and enveloping the same by the upper part or sides thereof.

Said upper receptacle 11 terminates at its lower end in the two hoppers 11$^a$ communicating with the chutes 13, which may be secured thereto in any suitable manner.

The lower ends of said chutes 13 discharge into said lower receptacle as shown.

Both the upper and lower receptacles and the chutes may be made of canvas, leather or any other suitable material, and the chutes may be reinforced by the helical coils 17 to keep them from collapsing. 15 is a neck band or strap for securing said upper receptacle 11 to the neck of the horse; it may be secured by stitching to said receptacle 11 by means of the thread 15$^a$ or it may be otherwise secured thereto in any suitable manner.

16 is a brow band or strap for securing our feed bag to the brow of the horse; its ends may be connected to said chute 13.

To close the top of the feed bag we provide the drawstring 18 in the band 19 at the top of the upper receptacle 11.

It is evident that the feed placed in the upper receptacle 11 will descend by gravity through the chutes 13 into the lower receptacle 12, where it will form a heap around the mouth of each chute; and by adjusting the lower receptacle 11 at the proper elevation by means of the straps 14, the feed may be brought to the very mouth of the horse, thereby doing away with the necessity for the horse to shake the bag, and thereby avoiding the spilling of the feed by the shaking of the bag.

It is also evident that our feed bag leaves the eyes and nose of the horse uncovered, thereby promoting the comfort of the horse.

Many changes could be made in the details of our feed bag without departing from the main scope of our invention; we do not therefore restrict ourselves to the details as shown in the drawings, but we intend to include also all mechanical equivalents and reasonably obvious modifications of our feed bag within the scope of our invention.

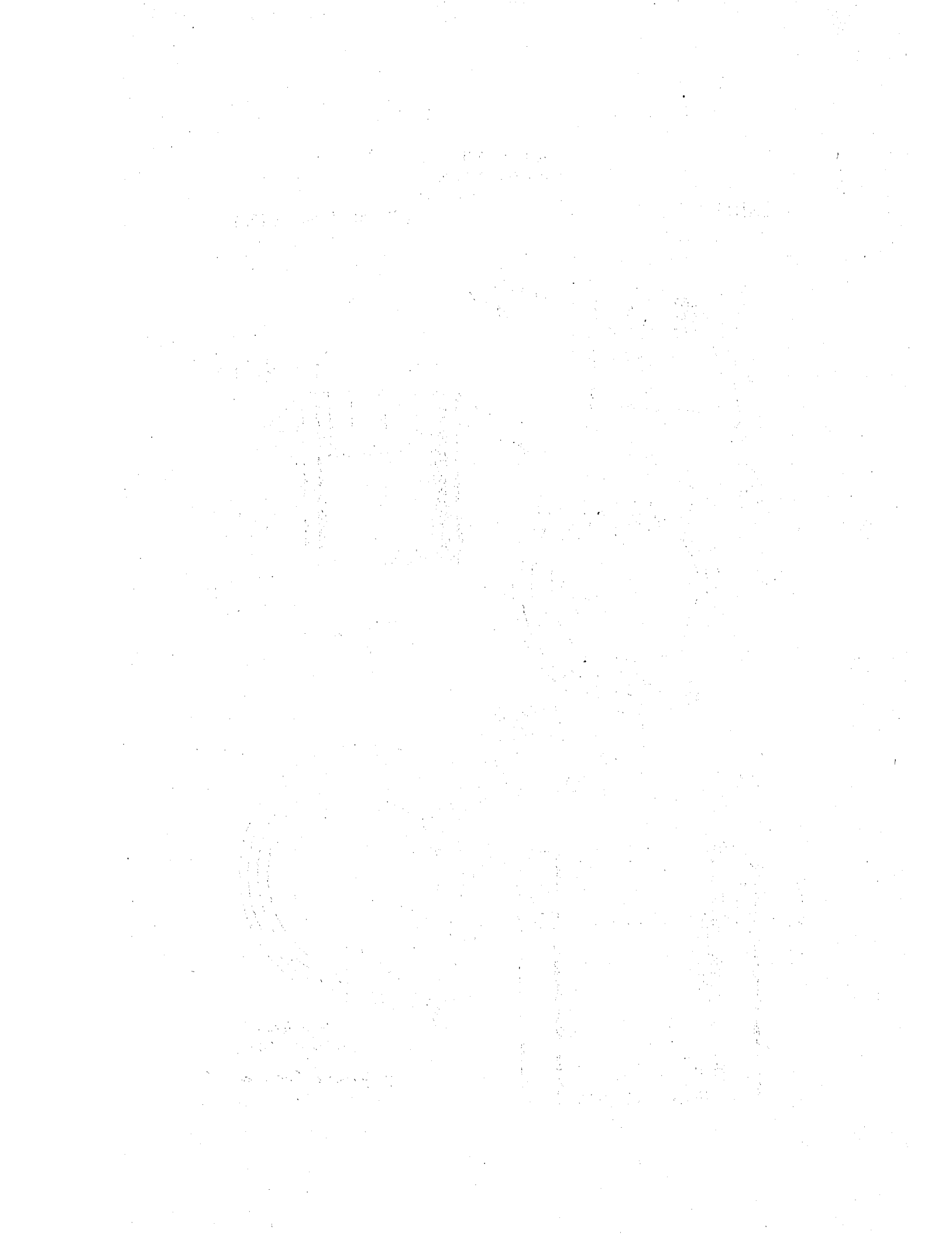

What we claim as our invention and desire to secure by letters patent—is:

1. A feed bag for horses comprising an upper receptacle for the feed, adapted to rest on the crest of the horse's head, a lower receptacle suspended from said upper receptacle and adapted to reach to the mouth of the horse thereunder, a means for securing said upper receptacle in place on the crest of the horse's head and a means for passing the feed from said upper receptacle to said lower receptacle.

2. A feed bag for horses comprising an upper receptacle for the feed, adapted to A. C. STORCK.
LIQUID FUEL BURNER.
APPLICATION FILED JAN. 27, 1921.
1,391,022.
Patented Sept. 20, 1921.
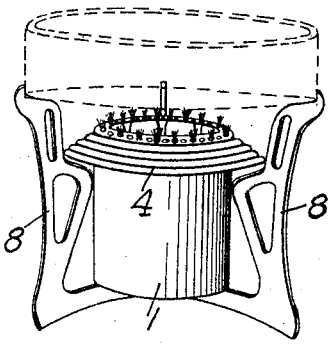
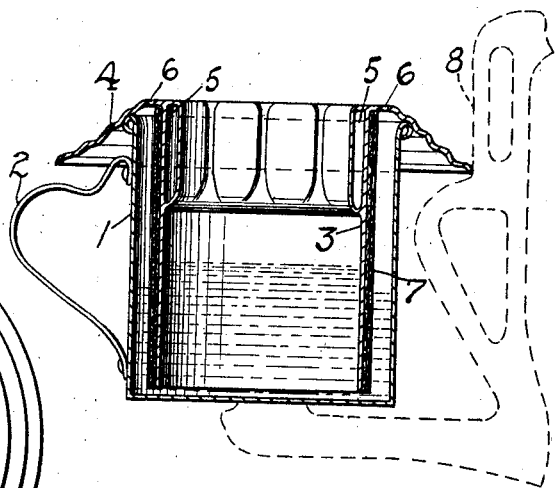
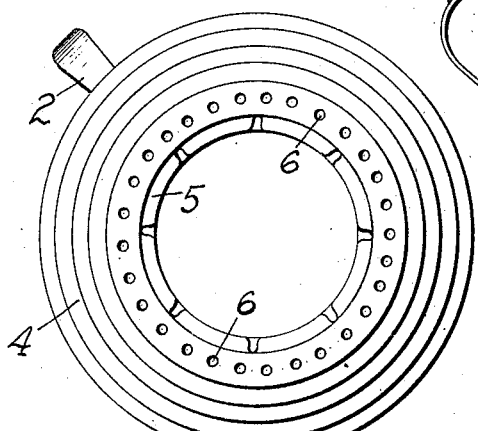
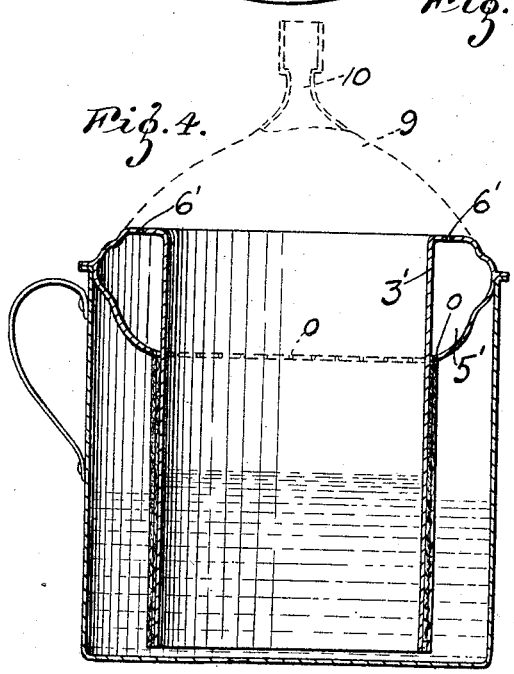
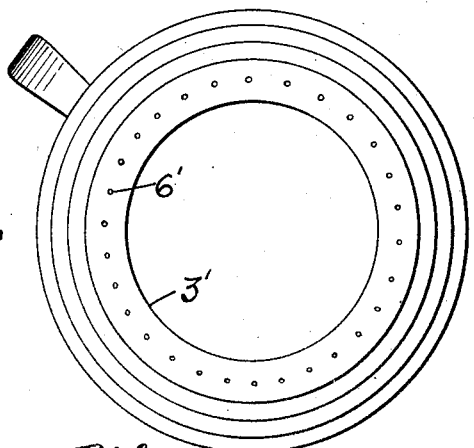
Inventor:
August C. Storck.
By Harry A. Berner
Attorney.